United States Patent [19]
Colley et al.

[11] Patent Number: 4,729,095
[45] Date of Patent: Mar. 1, 1988

[54] BROADCAST INSTRUCTION FOR USE IN A HIGH PERFORMANCE COMPUTER SYSTEM

[75] Inventors: Stephen R. Colley, Salinas, Calif.; Doran K. Wilde, Beaverton, Oreg.

[73] Assignee: Ncube Corporation, Beaverton, Oreg.

[21] Appl. No.: 864,596

[22] Filed: May 19, 1986

[51] Int. Cl.⁴ .................. G06F 13/00; G06F 15/16
[52] U.S. Cl. ............................................ 364/200
[58] Field of Search ... 364/200 MS File, 900 MS File

[56] References Cited

U.S. PATENT DOCUMENTS

| | | | |
|---|---|---|---|
| 4,168,469 | 9/1979 | Parikh et al. | 364/900 X |
| 4,247,892 | 1/1981 | Lawrence | 364/200 |
| 4,413,319 | 11/1983 | Schultz et al. | 364/200 |
| 4,414,620 | 11/1983 | Tsuchimoto et al. | 364/200 |
| 4,470,113 | 9/1984 | Oura | 364/200 |
| 4,598,400 | 7/1986 | Hillis | 370/60 |

*Primary Examiner*—Eddie P. Chan
*Attorney, Agent, or Firm*—Owen L. Lamb

[57] ABSTRACT

A broadcast pointer instruction has a first source operand (address pointer value) which is the starting address in a memory of message data to be broadcast to a number of processors through output ports. The broadcast pointer instruction has a first destination operand (first multibit mask), there being one bit position in the first mask for each one of the plurality of output ports. The address pointer value is loaded into each of the output ports whose numbers correspond to bit positions in the first mask that are set to be one, such that each output port that is designated in the first mask receives the starting address of the message data in the memory. A broadcast count instruction has a second source operand (a byte count value) equal to the number of bytes in the message data. The broadcast count instruction has a second destination operand (a second multibit mask), there being one bit position in the second mask for each one of the plurality of output ports. The byte count value is sent to each of the output ports whose numbers correspond to bit positions in the second mask register that are set to be one, such that each output port that is designated in the second mask receives the byte count value corresponding to the number of bytes in the message data that are to be transferred from the memory. Once the byte count is initialized, data are transferred from the starting address in memory over each output port designated in the masks, until the byte count is decremented to zero.

4 Claims, 5 Drawing Figures

BROADCAST INSTRUCTION FOR USE IN A HIGH PERFORMANCE COMPUTER SYSTEM

BACKGROUND OF THE INVENTION

1. Field of the Invention

The invention relates to data-processing systems, and more particularly, to an instruction mechanism for use in a high-performance, parallel-processing system.

2. Description of the Prior Art

Copending application Ser. No. 731,170 entitled "High Performance Computer System" of Stephen R. Colley, et al., filed on May 6, 1985, assigned to Ncube Corporation, and incorporated herein by reference, describes a parallel processor comprised of a plurality of processing nodes, each node including a processor and a memory. Each processor includes means for executing instructions, logic means connected to the memory for interfacing the processor with the memory and means for internode communication. The internode communication means connect the nodes to form a first array of order n having a hypercube topology. A second array of order n having nodes connected together in a hypercube topology is interconnected with the first array to form an order n+1 array. The order n+1 array is made up of the first and second arrays of order n, such that a parallel processor system may be structured with any number of processors that is a power of two. A set of I/O processors are connected to the nodes of the arrays by means of I/O channels. The means for internode communication comprises a serial data channel driven by a clock that is common to all of the nodes.

It is a primary object of the present invention to provide a new communication instruction mechanism for use in a data-processing architecture and apparatus utilizing parallel processing.

BRIEF SUMMARY OF THE INVENTION

Briefly, the above object is accomplished in accordance with an embodiment of the present invention as follows.

A broadcast pointer instruction is provided having a source operand which is the address in memory of a message to be broadcast to a number of processors. The broadcast pointer instruction also includes a destination operand which is a multibit mask. A mask register is connected to output channel registers such that every bit position in the mask register that is set to a predetermined value will allow the corresponding output channel address register to be loaded. Decoding means load the mask register with the mask bits of the destination operand of the broadcast pointer instruction. A broadcast count instruction is provided including a source operand which is a plural bit integer equal to the number of bytes in the message. The broadcast count instruction includes a destination operand which is a multibit mask. As transmission progresses, the address register is incremented and the count is decremented by the number of bytes transferred.

The major advantage of broadcasting is that the sending processor only has to access each transmitted datum once thus reducing the memory bandwidth used by the DMA facility.

BRIEF DESCRIPTION OF THE DRAWINGS

The foregoing and other objects, features, and advantages of the invention will be apparent from the following detailed description of a preferred embodiment of the invention, as illustrated in the accompanying drawings wherein.

DESCRIPTION

Figure 1:
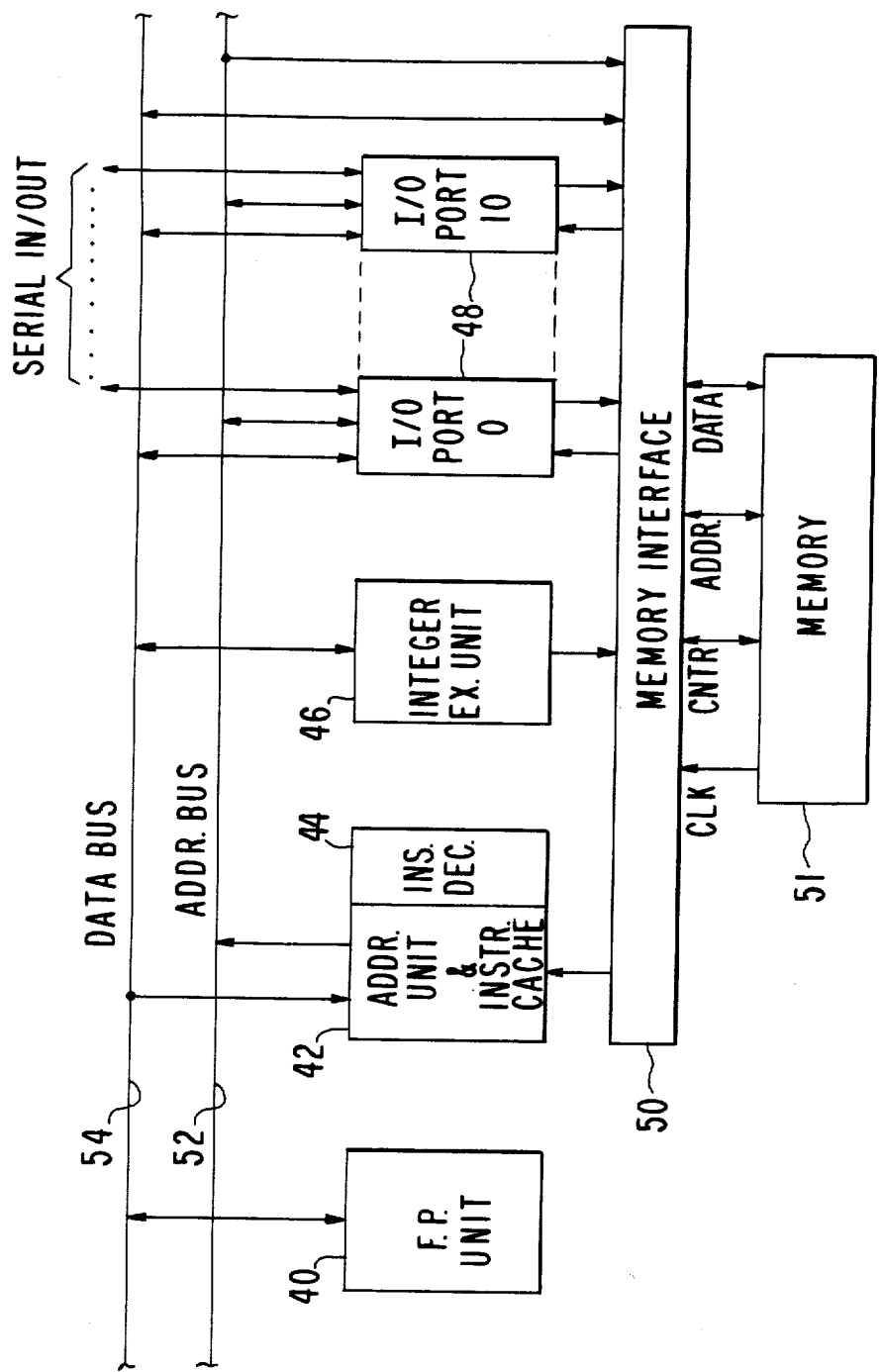
FIG. 1 is a detailed block diagram of a processor in which the present invention is embodied.

The processor is shown in FIG. 1, and is comprised of Floating Point Unit (40), Address Unit and Instruction Cache (42), Instruction Decoder (44), Integer Execution Unit (46), I/O Ports (48), and Memory Interface (50), which are attached to either or both of a common address bus (52), and data bus (54). These units are described in the above-identified Colley, et al. application.

Each of the 11 input and output ports (48), shown in FIG. 1, is an independent Direct Memory Access (DMA) channel and has two 32 bit registers: an address register and a count register. The address register contains a pointer to the least significant byte of the next halfword to be transferred. If it is an output port the data is moved from memory over interface (50) out to the port. If it is an input port the data that has been received from the output port of the sending processor is moved to memory. In both cases the count register is set to indicate the number of bytes to be sent or received. As data is sent or received, the appropriate address and count registers are incremented and decremented respectively by the number of bytes transferred. When the count reaches zero the ready flag in the Input or Output Status register is set and an interrupt is generated if an interrupt has been enabled.

The DMA channels operate independently of instruction processing. They begin functioning whenever a count register is set to a nonzero value.

I/O Ports

Figure 2A:
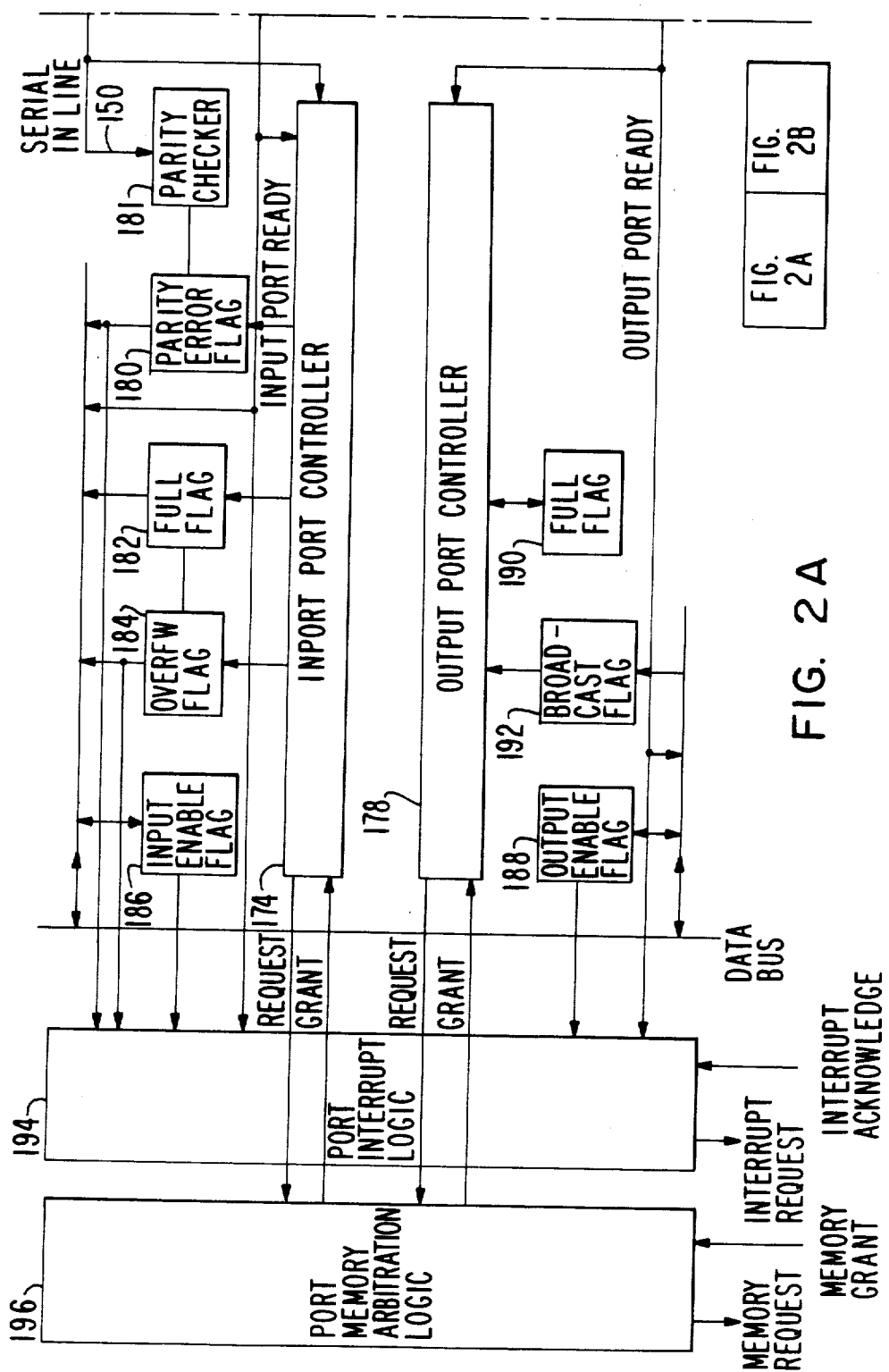
FIGS. 2A and 2B are a detailed block diagram of the one of the eleven serial I/O ports shown in FIG. 1.
Figure 2B:
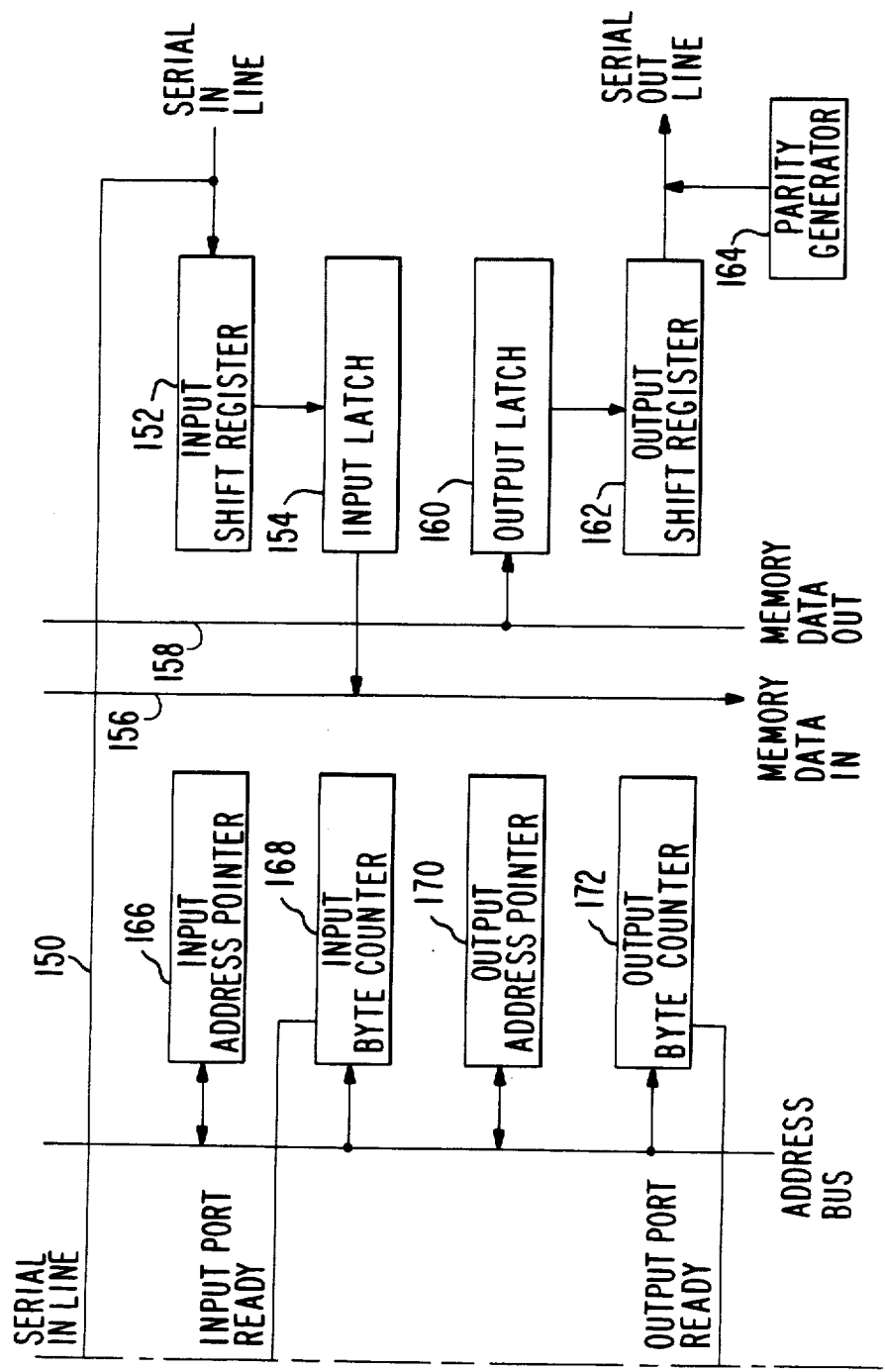

FIGS. 2A and 2B comprise a composite block diagram of a single I/O port representative of one of the 11 I/O ports (48) on the processor shown in FIG. 1. Each port has all the circuitry necessary to both receive and transmit serial messages. The format of the messages is described in Section 5.4.1 of the above-identified Colley, et al. application. Data are received on the serial data in line (150) and are framed in the input shift register (152). The information is then transferred in parallel to the input latch (154) and is stored there until it is transferred to the memory on the memory data in lines (156). Similarly, data to be transmitted is brought in from the memory data out-lines (158), stored in the output latch (160). From there it is transferred to the output shift register (162), and transmitted serially on the serial out line where it is combined with parity bits from the parity-bit generator (164). The input port and the output port both contain an address pointer and a byte counter. The address pointers (166, 170) point to the locations in memory where the message will be written to or read from.

The input and output byte counters (168, 172) are utilized to specify the length of message to be sent or received. All of these four registers are initialized by the appropriate instruction: the load address pointer instruction, and the load byte counter instruction for single channel transfer (or the broadcast count instruction for multiple channel transfer). After a message packet is received, the input address pointer (166) is incremented by two bytes and the input byte counter (168) is decremented by two bytes. After a message packet has been sent, the output address pointer (170) is incremented by two bytes and the output byte counter (172) is decremented by two bytes.

The control portion of the serial port is shown in FIG. 2A. There is an input controller (174) and an output controller (178) which control the timing of the serial transmission. These controllers control the timing of when the parity bit is sent out and when the parity bit is to be checked on incoming data. They also control the various flags. The parity error flat (180) is set by the input controller when there is a parity error detected on an input message. The full flag (182) is set by the input controller during the time that the input latch (154) is buffering a message which has not yet been transferred into memory, The overflow flag (184) is set by the input controller when the input latch is holding a message to be sent to memory and the input shift register (152) finishes receiving a second message which overrides the first message before it is transferred to memory. The input enable flag (186) is a flag which is both readable and writable by the user to enable interrupts that occur when the input port becomes ready, i.e. when the byte count goes to zero. On the output port there is an output enable flag (188) which, when enabled, will generate an interrupt when the output port ready line becomes true, i.e., when the byte count goes to zero (when the message has been fully transmitted). This signals the user that it is necessary to reinitialize the port with a new message. The full flag (190) on the output port controller is set for the period of time when there is data in the output latch which has not been transferred to the output shift register. The broadcast flag (192) is initialized by the broadcast count instruction. When this flag is set, it indicates that this particular output port is a member of the current broadcast group. When an output port is a member of the current broadcast group, then any data coming over the memory data out bus (158) for broadcasting will be transmitted out of this port and simultaneously out of all other ports that have their broadcast flags on.

The port interrupt logic (194) generates interrupts if enabled when the input or output ports have finished transmitting or receiving messages, as signaled by the appropriate byte counter being decremented to zero.

The port memory arbitration logic (196) performs the function of arbitrating for memory with all the other I/O ports. The winner of this arbitration must again arbitrate with other units on the chip in the memory interface unit described in Section 8.8 of the above-identified Colley, et al. application. When an arbitration is successful and a memory grant is given, the memory grant line indicates that data either has been taken from the memory data in bus or that the data is available on the memory data out bus shown in FIG. 2B.

Each of the I/O channels has an address register (166), a count register, a "ready" flag and an interrupt enable flag. In addition each input channel has a parity error flag, an overrun error flag and a "DMA pending" flag. Besides the enable for each channel there are two global enable flags in the Program Status (PS) register. The II flag disables all input interrupts (including errors) even if the corresponding channel flag is enabled and the IO flag disables all output interrupts.

In order to send a message from a memory buffer on a single output channel, a processor first either checks its ready flag or enables its interrupt and waits for a "ready" interrupt. As soon as the channel indicates that it is ready (idle), the address register is set to point to the first (low) byte of the message, which must begin on an even boundary. This is accomplished by executing a LPTR (Load Pointer) instruction. The source (src) operand of this instruction is the address of the message buffer and the destination (des) operand is an integer whose value determines which of the channel registers is to be loaded:

0,1, . . . ,9,31—are input channels (10,11, . . . 30 are reserved)

32,33, . . . ,41,63—are output channels (42,43, . . . ,62 are reserved).

In order to start the automatic message output, the corresponding count register must be set to the number of bytes in the message. The low order bit is forced to zero in both the address and the count registers; thus the message buffer must start on an even byte boundary and be an even number of bytes long. This is done by executing a LCNT (Load Count) instruction. The destination operand indicates the register to be loaded as explained above for the LPTR instruction and the source operand is the count value (an unsigned 32 bit integer). The LCNT instruction also resets the parity and overrun error flags when setting up an input port. The message transmission is automatic and as data is sent the address register is incremented and the count is decremented by the number of bytes transferred. When the count becomes zero the output stops, the ready flag is set and if enabled the ready interrupt is generated.

The foregoing describes the sending of a message on a single channel. In order to send a message over several channels at once, one must first ensure that the desired output channels are ready. Then a BPTR (Broadcast Pointer) instruction is executed, followed by a BCNT (Broadcast Count) instruction. The definition of each instruction is given in the above-identified Colley, et al. application and repeated below:

| BCNT — BROADCAST COUNT | |
|---|---|
| Opcode: | C5  BCNT  Broadcast CouNT |
| Assembler Syntax: | BCNT src, des |
| Operation: | src → des MASK (All Output Count Register #'s) |
| Flags: | no changes |
| Description: | The Output Count registers whose numbers correspond with the bit positions in des that are set to one are loaded with the src value. The Output Count registers are numbered 32,33, . . . ,41,63 so the bit positions in des are understood to be offset by 32. Both src and des are Word values. |
| Exceptions: | none |
| BPTR — BROADCAST POINTER | |
| Opcode: | D5  BPTR  Broadcast PoinTeR |
| Assembler Syntax: | BPTR src,des |
| Operation: | src → des MASK (All Output Register #'s) |
| Flags: | no changes |
| Description: | The Output Registers whose numbers correspond with the bit positions in des that are set to one are loaded with the src. This instruction sets up a |

| | -continued |
|---|---|
| | group of Output Pointer registers to address a memory area containing a message to be broadcast. The Pointer registers should be set up before the Count registers (BCNT) are loaded. Both src and des are Word values. |
| Exceptions: | none |

As in the LPTR instruction, the source operand of the BPTR is specified to be the address of the message, but its destination operand is a 32 bit mask, instead of just an integer as in the LPTR instruction. Every bit position in the mask that is set to one will activate the corresponding output channel address register for loading. (Bit position 0 corresponds to output channel 32, position 1 to channel 33, etc.). The message broadcast is started by executing a BCNT (Broadcast Count) instruction whose destination operand is a mask as explained above for the BPTR instruction and whose source operand is an unsigned 32 bit integer equal to the number of bytes in the message.

Figure 3:
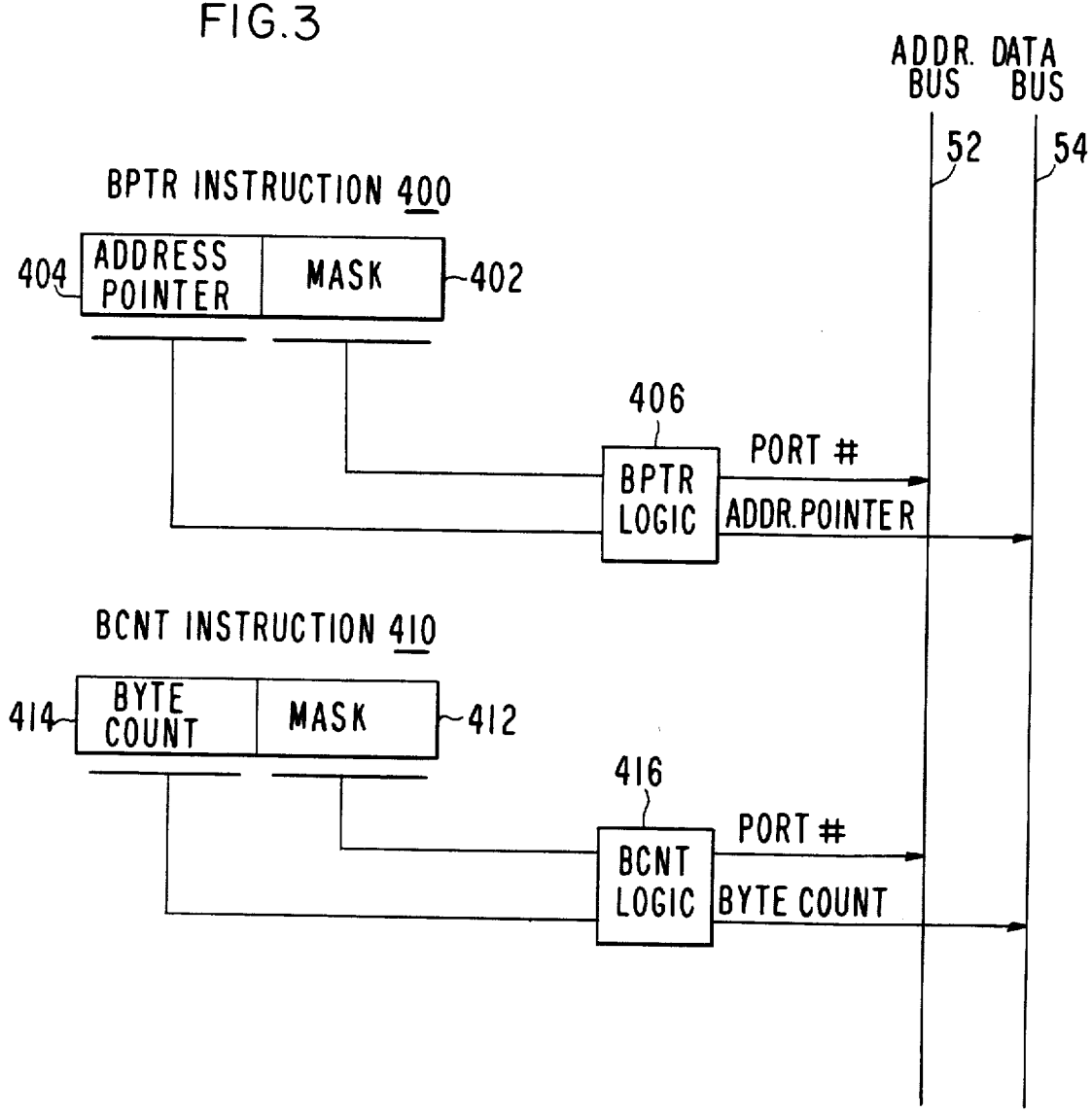
FIG. 3 is a block diagram of a portion of the logic within the instruction decoder and address unit of FIG. 1; and, FIG. 4 is a diagram of a typical program segment illustrating the use of the present invention.

The logic for performing the above operation is shown in FIG. 3, which is a block diagram of a portion of the logic within the instruction decoder and address unit of FIG. 1.

The instruction decoder (44) has logic for decoding the broadcast pointer instruction. The broadcast pointer instruction has a source operand, the source operand being an address pointer which is the address in the memory of a message to be broadcast to a number of the processors through the ports. The broadcast pointer instruction has a destination operand, the destination operand being a first multibit mask, there being at least one bit position in the first mask for each one of the plurality of output ports. The BPTR instruction register (400) stores the first multibit mask (402) and the first source operand (404).

The address unit (42) has BPTR logic (406) connected to the first mask register (402) and to the address bus (52) and data bus (54) for placing on the data bus the address pointer value in the source operand (404) of the broadcast pointer instruction, and for placing on the address bus the addresses of the output ports whose numbers correspond to bit positions in the first mask register that are set to one. In this manner each output port that is designated in the mask (402) receives the address of the data in main memory (51).

The instruction decoder (44) has logic for decoding the broadcast count instruction. The broadcast count instruction has a source operand. The source operand being a plural bit integer equal to the number of bytes in the message in main memory (51). The broadcast count instruction has a destination operand, the destination operand being a second multibit mask, there being at least one bit position in the second mask for each one of the plurality of output ports. The BCNT register (410) stores the second multibit mask (412) and the source operand (414).

The address unit (42) has BCNT logic (416) connected to the second mask register (412) and to the address bus (52) and data bus (54) for placing on the data bus the byte count value in the source operand (414) of the broadcast count instruction, and for placing on the address bus the addresses of the output ports whose numbers correspond to bit positions in the second mask register that are set to one. In this manner each output port that is designated in the mask (412) receives the count of the number of bytes of data in main memory (51) that are to be transferred.

Figure 4:
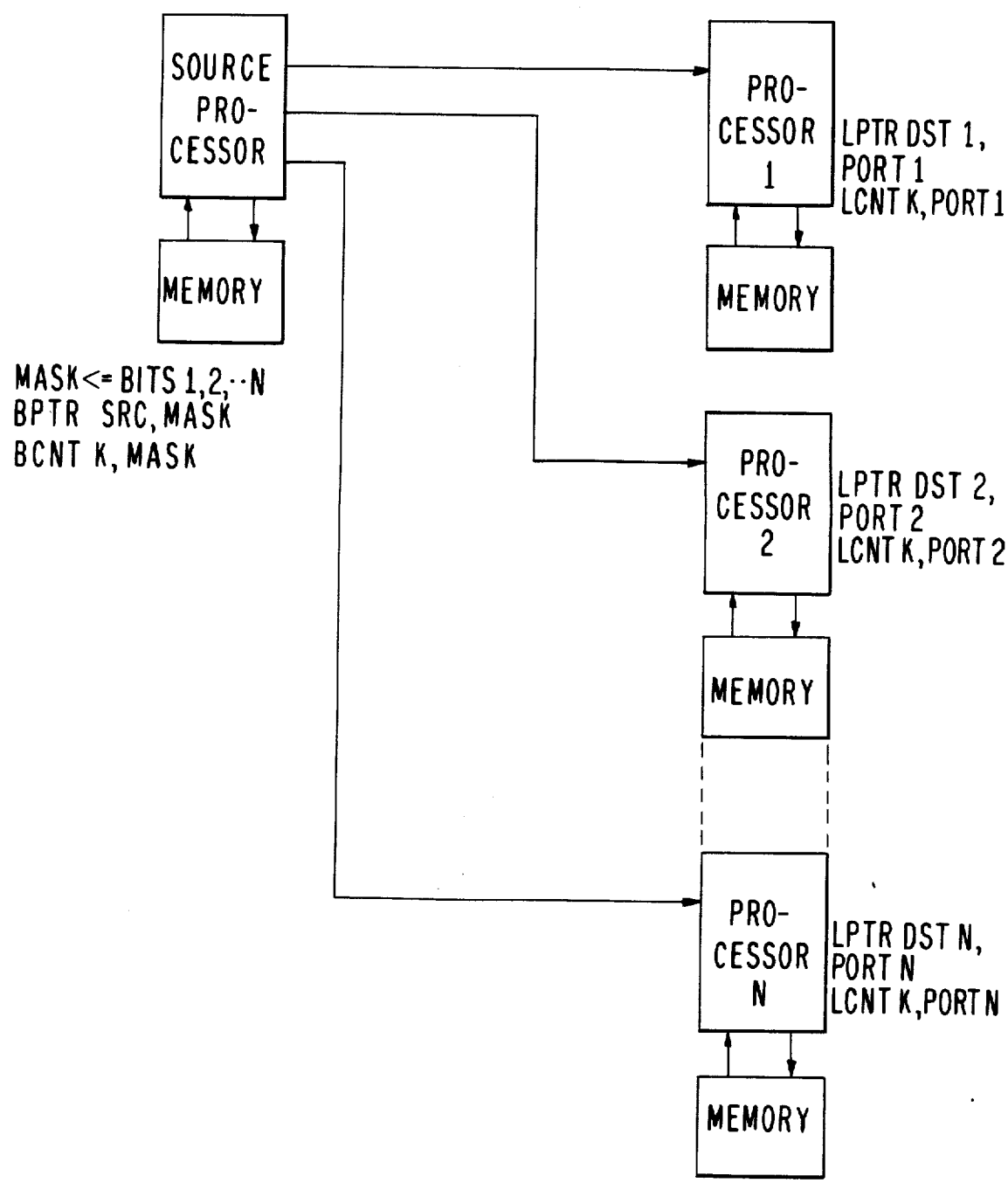

In order for a message to be transmitted successfully the corresponding input channel of the receiving processor must first be set up with an address to an input buffer and the same count as the transmitting output channel. The program for accomplishing this is shown in FIG. 4. It uses a software protocol that always sends a single halfword as the length of the desired message and waits for the receiving processor to respond with a halfword code that indicates "ok to send message". This protocol works because the last halfword that is sent remains available for DMA even if the receiving processor's input channel is uninitialized (count=zero). The presence of this data in the input channel is indicated by the corresponding bit in the INPUT DMA PENDING register (which can be tested by software) being set. Thus as soon as the count register is set to one, the halfword (either the length or on "ok to send") is stored in memory.

Before attempting to DMA the data to memory that is in an uninitialized input port the error (Overrun and Parity) flags must first be checked or they will be lost. This is because the Load Count instruction clears the error flags.

The processor recognizes two types of errors in communication. Each halfword is sent with a parity bit and on reception a parity check is made. Also if a halfword is received into a DMA channel before the previous one is stored in memory an input overrun error is detected. (Overrun can occur when the input count goes to zero before the output count—a software error, or when too many messages are being sent to the processor at the same time.) If either type of error occurs the corresponding flag is set and when the input count reaches zero instead of "ready", an "input error" interrupt is generated (if the II flag is set). A software error that is not detected by the processor occurs when the output count is smaller than the input.

The following sequence of events takes place for the broadcast function:

(1) The destination processors 1, 2, ... N, initialize their respective input ports;
(2) The source processor initializes its output ports with the broadcast pointer (BPTR) and broadcast count (BCNT) instructions; and,
(3) K bytes are sent by DMA from source memory to N destination memories.

In the source processor the instruction sequence is:
Mask<=bits 1, 2, ... N
BPTR src, mask
BCNT k, mask In each destination processor the instruction sequence is:
LPTR dst N, port N
LCNT K, port N
Where:
K=number of bytes sent.
src=address in source processor memory
dst N=address in destination processor N memory While the invention has been particularly shown and described with reference to preferred embodiments thereof, it will be understood by those skilled in the art that the foregoing and other changes in form and detail may be made therein without departing from the spirit and scope of the invention.

What is claimed is:

1. For use in a data processing system comprised of a plurality of processors, each one of said processors including an execution unit (46) and a memory (51), said processors being able to communicate with each other through a plurality of input and output ports (48), each output port including an output address pointer register (170) which points to locations in said memory (51) from which data are to be transferred, at least one of said processors including instruction decoding means (44) and an address unit (42) having access to said memory (51) over a memory interface (50), said memory (51) having stored therein a broadcast pointer instruction (400), said address unit (42), and said I/O ports being connected together by a common address bus (52) and a common data bus (54), said I/O ports having access to said memory (51) over said memory interface (50), a communication mechanism in said one processor comprising:

means in said instruction decoder (44) for decoding said broadcast pointer instruction;

said broadcast pointer instruction (400) including a first source operand, said first source operand being an address pointer value which is the starting address in said memory (51) of message data to be broadcast to a number of said processors through said ports (48);

said broadcast pointer instruction (400) including a first destination operand, said first destination operand being a first multibit mask, there being at least one bit position in said first mask for each one of said plurality of output ports in said one processor; and, a first register (404, 402) for storing said first multibit mask (404) and said first source operand (402), said address unit (42) including first logic (406) connected to said first register (404, 402) and to said common address and data bus (52, 54) for placing on said data bus (54) said address pointer value (404) in said first source operand of said broadcast pointer instruction, and for sequentially placing on said address bus (54) the port number of each of said output ports whose numbers correspond to bit positions in said first mask register (402) that are set to be one, such that each output port that is designated in said first mask (404) receives said starting address of the message data in said memory (51), means in said output port for storing said starting address in said output address pointer register and for outputting said message data in said memory (51) to the processors identified in said broadcast pointer instruction (400) via said input port of the processors identified in said broadcast pointer instruction (400).

2. The combination in accordance with claim 1 wherein said memory (51) has stored therein a broadcast count instruction (410), each output port further including an output byte count register (172), said communication mechanism further comprising:

means in said instruction decoder (44) for decoding said broadcast count instruction (410);

said broadcast count instruction including a second source operand, said second source operand being a byte count value equal to the number of bytes in said message data;

said broadcast count instruction including a second destination operand, said second destination operand being a second multibit mask, there being at least one bit position in said second mask for each one of said plurality of output ports (48);

a second register (414, 412) for storing said second multibit mask (412) and said second source operand (414), said address unit (42) including second logic (416) connected to said second register (412, 414) and to said common address and data bus (52, 54) for placing on said data bus (54) said byte count value (414) in said second source operand of said broadcast count instruction, and for sequentially placing on said address bus (52) the port number of each of said output ports whose numbers correspond to bit positions in said second mask register (412) that are set to be one, such that each output port that is designated in said second mask (412) receives said byte count value corresponding to the number of bytes in said message data that are to be transferred from said memory (51).

3. The combination in accordance with claim 1 wherein one of said processors is a sending processor and another one of said processors is a receiving processor, said combination further comprising:

an input port associated with said receiving processor;

an output port associated with said sending processor;

first means for setting said input port of said receiving processor with an address to an input buffer; and, second means for setting said input port of said receiving processor with the same count as said output port of said sending processor.

4. The combination in accordance with claim 2 wherein one of said processors is a sending processor and another one of said processors is a receiving processor, said combination further comprising:

an input port associated with said receiving processor;

an output port associated with said sending processor;

first means for setting said input port of said receiving processor with an address to an input buffer; and, second means for setting said input port of said receiving processor with the same count as said output port of said sending processor.

* * * * *